(12) United States Patent
Trabold et al.

(10) Patent No.: US 7,087,337 B2
(45) Date of Patent: Aug. 8, 2006

(54) FLOW FIELD GEOMETRIES FOR IMPROVED WATER MANAGEMENT

(75) Inventors: Thomas A Trabold, Pittsford, NY (US); Jon P Owejan, Rochester, NY (US)

(73) Assignee: General Motors Corporation, Detroit, MI (US)

( * ) Notice: Subject to any disclaimer, the term of this patent is extended or adjusted under 35 U.S.C. 154(b) by 30 days.

(21) Appl. No.: 10/772,850

(22) Filed: Feb. 5, 2004

(65) Prior Publication Data

US 2005/0175883 A1    Aug. 11, 2005

(51) Int. Cl.
*H01M 2/00* (2006.01)
*H01M 2/14* (2006.01)
*H01M 8/02* (2006.01)
*H01M 8/10* (2006.01)

(52) U.S. Cl. ............ 429/34; 429/38; 429/30; 429/12

(58) Field of Classification Search ........ 429/34, 429/38, 39, 12
See application file for complete search history.

(56) References Cited

U.S. PATENT DOCUMENTS

| | | | |
|---|---|---|---|
| 3,432,357 A * | 3/1969 | Dankese | 429/34 |
| 6,051,331 A | 4/2000 | Spear, Jr. et al. | 429/34 |
| 6,649,297 B1 * | 11/2003 | Marchand et al. | 429/34 |
| 6,663,994 B1 * | 12/2003 | Fly et al. | 429/30 |
| 6,783,884 B1 * | 8/2004 | Gibb et al. | 429/38 |

OTHER PUBLICATIONS

Akbar, M.K., Plummer, D.A. and Ghiaasiaaan, S.M., "On gas-liquid two-phase flow regimes in microchannels," Int. J. Multiphase Flow, vol. 29, 855-865 (2003).

Wilkinson, D.P. and Vanderleeden, O., "Serpentine flow field design," Chapter 30 in Handbook of Fuel Cells—Fundamentals, Technology and Applications, W. Vielstich et al. (Eds.), John Wiley & Sons, Ltd. (2003).

* cited by examiner

*Primary Examiner*—Patrick Joseph Ryan
*Assistant Examiner*—Angela J. Martin
(74) *Attorney, Agent, or Firm*—Harness, Dickey & Pierce, P.L.C.

(57) ABSTRACT

An assembly for a fuel cell including an electrically conductive fluid distribution element including a flow field disposed on a surface of the element, wherein the flow field includes a plurality of channels for carrying the gaseous reactants of the fuel cell. The assembly also includes an electrically conductive member disposed at the surface of the element to serve as a gas diffusion media. The channels of the element include a plurality of sidewalls formed in various orientations, and the orientations of the side-walls form a cross-sectional geometry of the channel such that water collection regions are formed at an interface of the electrically conductive fluid distribution element and the electrically conductive member, and at a bottom portion of the channel.

16 Claims, 11 Drawing Sheets

FLOW FIELD GEOMETRIES FOR IMPROVED WATER MANAGEMENT

FIELD OF THE INVENTION

The present invention relates to a fuel cell. More particularly, the present invention relates to the channel configuration of a flow field on a bipolar plate for a fuel cell.

BACKGROUND OF THE INVENTION

Fuel cells have been proposed as a power source for electric vehicles and other applications. One such fuel cell is the PEM (i.e. Proton Exchange Membrane) fuel cell that includes a so-called "membrane-electrode-assembly" (MEA) having a thin, solid polymer membrane-electrolyte having a pair of electrodes (i.e., an anode and a cathode) on opposite faces of the membrane-electrolyte. The MEA is sandwiched between a pair of electrically conductive fluid distribution elements (i.e., bipolar plates) which serve as current collectors for the electrodes, and contain a so-called "flow field" which is an array of lands and grooves formed in the surface of the plate contacting the MEA.

The lands conduct current from the electrodes, while the grooves between the lands serve to distribute the fuel cell's gaseous reactants evenly over the faces of the electrodes. Gas diffusion media are positioned between each of the electrically conductive fluid distribution elements and the electrode faces of the MEA, to support the MEA where it confronts grooves in the flow field, and to conduct current therefrom to the adjacent lands.

A drawback of fuel cells, however, is the phenomenon of water being impeded from flowing outward from the MEA, often referred to as "flooding". Flooding can hinder a fuel cell's operation at low current density when the air flow through the cathode flow field plate is not sufficient to drive the water removal process. Excess liquid water also tends to plug the pores in gas diffusion media, and thereby isolate the catalytic sites from the reactant oxygen flow. Therefore, there is a need for an improved fuel cell design to minimize the aforesaid drawbacks.

SUMMARY OF THE INVENTION

With the above drawbacks in mind, the present invention is directed to an assembly for a fuel cell including an electrically conductive fluid distribution element including a flow field disposed on a surface of the element, wherein the flow field includes a plurality of channels for carrying the gaseous reactants of the fuel cell. The assembly also includes an electrically conductive member disposed at the surface of the element to serve as a gas diffusion medium. The channels of the element include a plurality of sidewalls formed in various orientations providing a cross-sectional geometry of the channel such that localized water collection regions are formed at an interface of the electrically conductive fluid distribution element and the electrically conductive member, and at a bottom portion of the channel.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
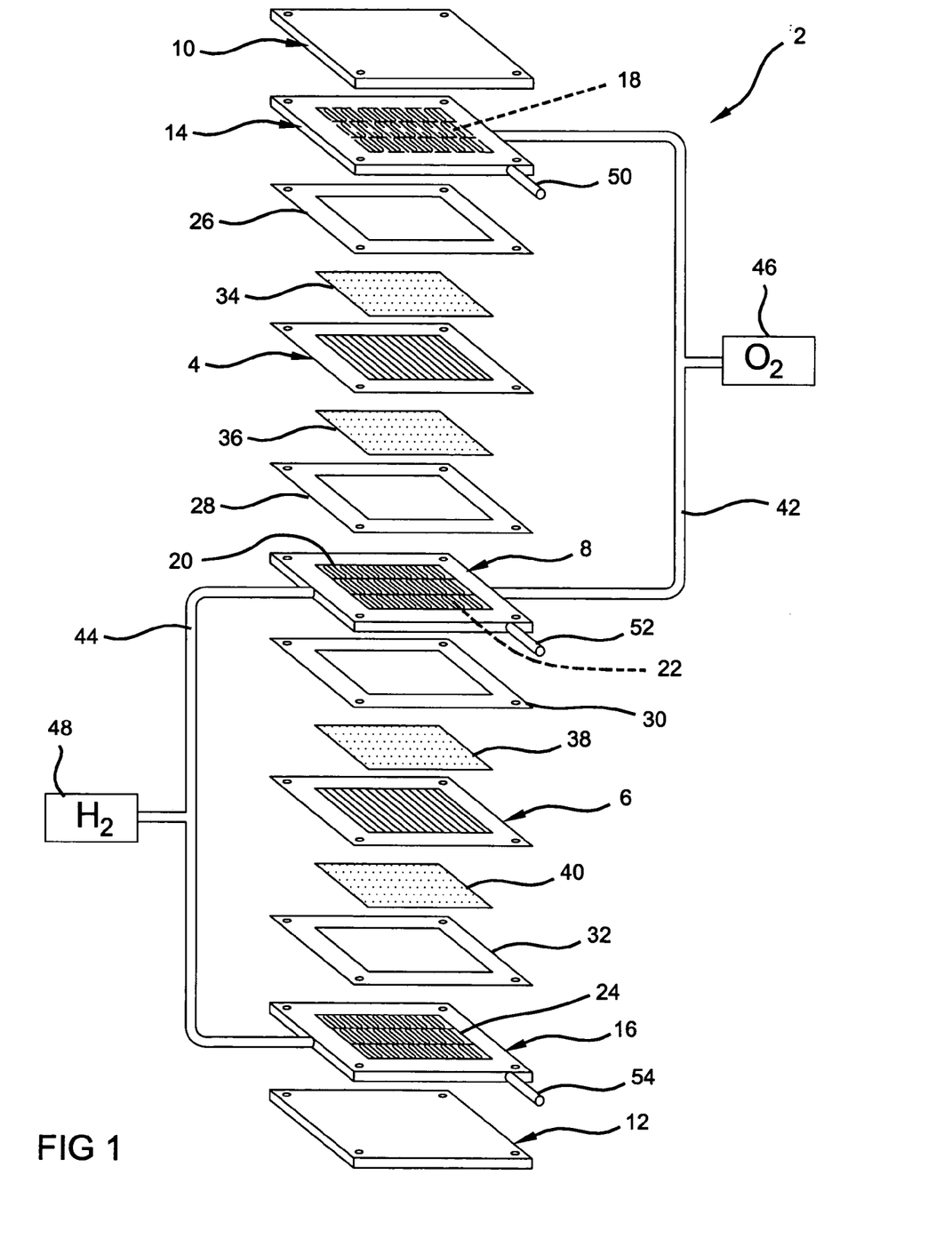
FIG. 1 is a schematic, exploded illustration of a PEM fuel cell stack (only two cells shown) according to the present invention.

FIG. 1 depicts a two cell, bipolar fuel cell stack 2 having a pair of membrane-electrode-assemblies (MEAs) 4 and 6 separated from each other by an electrically conductive fluid distribution element 8, hereinafter bipolar plate 8. The MEAs 4 and 6 and bipolar plate 8, are stacked together between clamping plates, or end plates 10 and 12, and end contact elements 14 and 16. The end contact elements 14 and 16, as well as both working faces of the bipolar plate 8, contain a plurality of grooves or channels 18, 20, 22, and 24, respectively, for distributing fuel and oxidant gases (i.e. $H_2$ and $O_2$) to the MEAs 4 and 6.

Nonconductive gaskets 26, 28, 30, and 32 provide seals and electrical insulation between the several components of the fuel cell stack. Gas permeable conductive materials for diffusion media 34, 36, 38, and 40 that press up against the electrode faces of the MEAs 4 and 6. The end contact elements 14 and 16 press up against the diffusion media 34 and 40 respectively, while the bipolar plate 8 presses up against the diffusion medium 36 on the anode face of MEA 4, and against diffusion medium 38 on the cathode face of MEA 6.

Oxygen is supplied to the cathode side of the fuel cell stack from storage tank 46 via appropriate supply plumbing 42, while hydrogen is supplied to the anode side of the fuel cell from storage tank 48, via appropriate supply plumbing 44. Alternatively, ambient air may be supplied to the cathode side as an oxygen source and hydrogen to the anode from a methanol or gasoline reformer, or the like. Exhaust plumbing (not shown) for both the $H_2$ and $O_2$ sides of the MEAs 4 and 6 will also be provided. Additional plumbing 50, 52, and 54 is provided for supplying liquid coolant to the bipolar plate 8 and end plates 14 and 16. Appropriate plumbing for exhausting coolant from the bipolar plate 8 and end plates 14 and 16 is also provided, but not shown.

Figure 2:
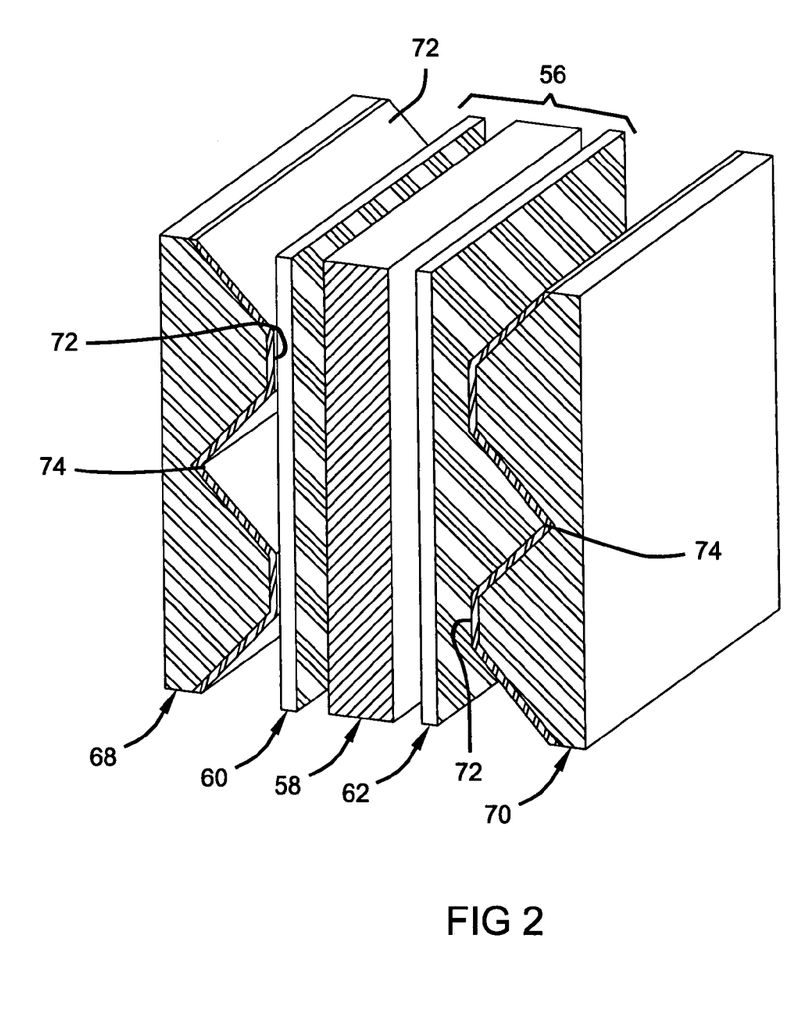
FIG. 2 is an enlarged, exploded view of a fuel cell according to a first embodiment of the present invention.

FIG. 2 is an enlarged, exploded view of various components of a fuel cell according to a first embodiment of the present invention. As can be seen in FIG. 2, the fuel cell comprises a membrane electrode assembly (MEA) 56 that includes an ionically conductive member 58 sandwiched by an anode electrode 60 and a cathode electrode 62. The MEA 56 is further sandwiched by an anodic surface bipolar plate 68 and a cathodic surface bipolar plate 70. Please note that gas diffusion media are preferably disposed between the bipolar plates 68 and 70 and MEA 56, but are not necessary to the present invention and, therefore, have been omitted from this figure for simplicity.

When a fuel stream of pure $H_2$ or hydrogen reformate is dispersed over the anode 60, electrons that are produced by the hydrogen oxidation reaction are conducted a short distance to the adjacently disposed electrically conductive fluid distribution element, or bipolar plate 68. Since the lands 72 of the bipolar plate 68 directly contact the anode electrode 60 (or diffusion media if used), electrical conductivity is facilitated and enhanced. Protons ($H^+$) produced from the anodic reaction, combined with water from the humid fuel stream pass through the anode 60 to the ionically conductive member 58 and through to the cathode 62. At the cathode side of the MEA 56, a stream of $O_2$ or ambient air that contains oxygen is dispersed over the cathode 62. The oxygen undergoes a reduction reaction and the electrons that are produced are also conducted a short distance to another adjacently disposed bipolar plate 70. The reduced oxygen then reacts with the protons from the anode 60 and liquid water is produced.

Figure 3A:
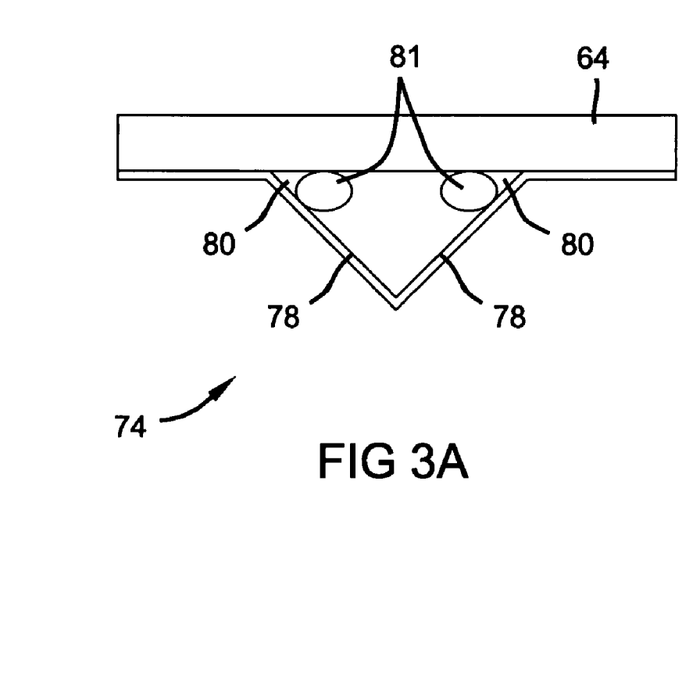
FIG. 3A is a cross-sectional view of a channel according to the first embodiment of the present invention depicting where water produced by the electrochemical reaction of the fuel cell accumulates in the channel.
Figure 3B:
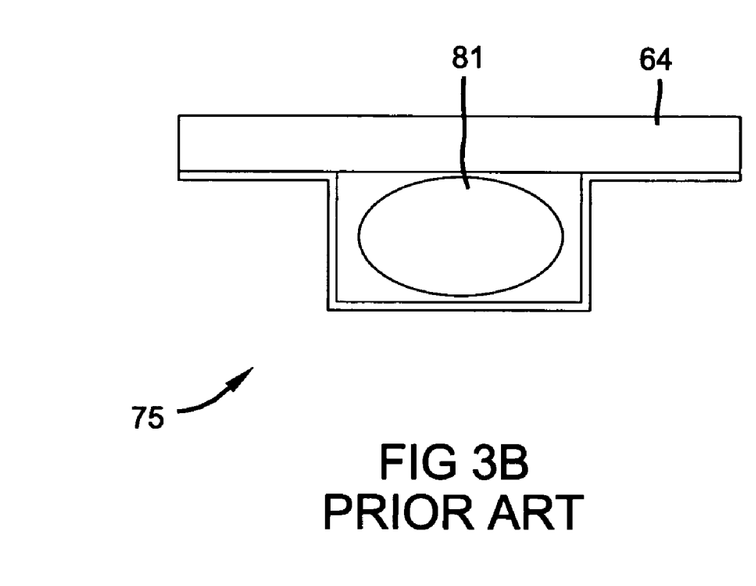
FIG. 3B is a cross-sectional view of a prior art channel depicting where water accumulates in the channel.

In accordance with the present invention and in order to further facilitate the electrochemical reaction and improve the convective removal of water from the fuel cell, the channels 74 of bipolar plates 68 and 70 are configured to provide localized water collection regions. In this regard, the cross-section of the channels 74 (shown in FIG. 3A) differ from the conventional rectangular or square shape (shown in FIG. 3B), in that they are a triangular shape or V-shape. More specifically, sidewalls 78 of the channels 74 are tapered or ramped upwards toward the diffusion medium 64 and MEA 56 such that an acute angle is formed between the diffusion medium 64 and the sidewalls 78 of the channel 74.

The use of channels 74 with ramped sidewalls 78 dramatically changes the distribution of the water through the channel 74. That is, referring to FIG. 3A, it can be seen that when, for example, a triangular cross-section is used as the geometry of the channel 74, the slugs of water 81 tend to collect in the corners 80 of the channel 74 at the diffusion medium/gas channel interface, thereby forming localized water collection regions. These regions are distributed around the cross-sides of the channel such that small discrete water slugs are accommodated within the channel 74 while allowing sufficient area for the reactant gases to flow therethrough. Removal of the accumulation of small distributed water slugs 81 may be achieved with low velocities and flow rates as compared with a large concentrated water slug. In contrast, referring to FIG. 3B, a large water slug 81 tends to pool in the middle of and block a channel 75 with perpendicular sidewalls found in a rectangular cross section.

Figure 5:
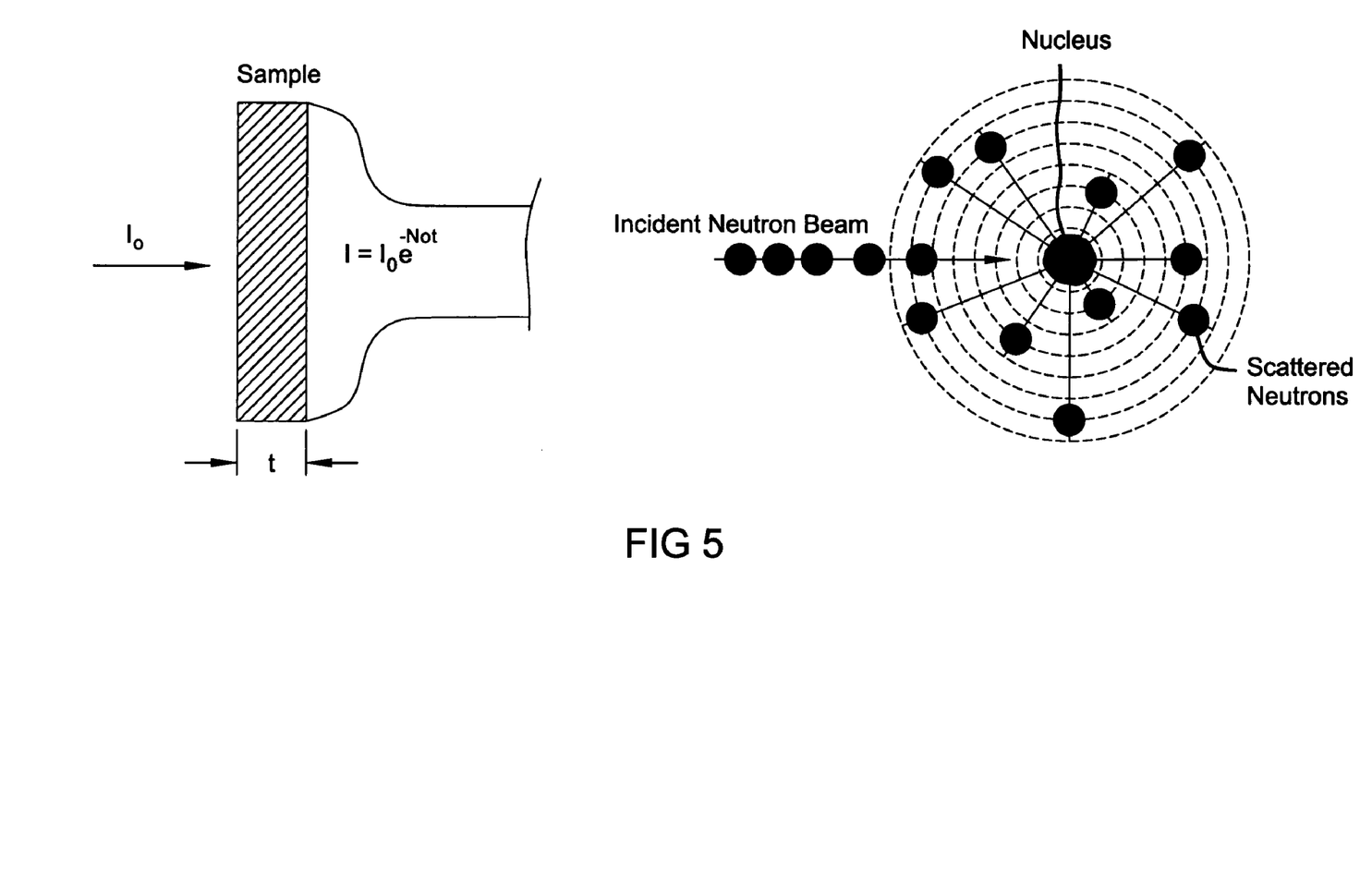
FIG. 5 is a diagram depicting the principles of neutron radiography.

In determining that a ramped sidewall geometry reduces the size of the water slugs 81 that accumulate in the channels 74 of the bipolar plates 68 and 70, a neutron radiography technique is used. This method utilizes the knowledge that radiation (x-rays, gamma rays, or neutrons) is attenuated by matter through absorption or scattering (FIG. 5). Since different materials have different degrees of attenuation, neutron radiography can be used to give an image of non-transparent materials, or to give a thickness/concentration of a material inside a structure. Analysis of neutron radiographs is based on the relation:

$$I=I_0 e^{-N\sigma t}$$

where I=the intensity after the sample, $I_O$=the radiation incident to the sample, $\sigma$=the neutron cross section ($10^{-24}$ $cm^2$), N=the material density (atoms/$cm^3$), and t=the sample cross sectional thickness (cm). For a neutron beam transmission through a "sandwich" of various materials with different material densities (N), neutron cross sections ($\sigma$), and cross-sectional thicknesses (t), the following formula may be used:

$$I=I_0 e^{-\Sigma N_i \sigma_i t_i}$$

where i is an index for the various layers in the "sandwich".

To obtain data for the distribution of liquid water throughout the cell, a "baseline" image of the dry cell is first acquired. This is done by averaging at least 100 images at each CCD pixel of a neutron radiograph device to measure the neutron flux at each point (pixel) of the cell.

$$I_{dry}=I_0 e^{-[(N\sigma t)_{Al}+(N\sigma t)_C+(N\sigma t)_{Cu}+\ldots]}$$

where Al, C, Cu . . . represent aluminum, carbon, copper and any other materials used in the fuel cell construction.

Next, an image of an operating cell is acquired. Then, a ratio of the operating cell image and the dry cell image is computed.

$$\frac{I_{wet}}{I_{dry}} = \frac{I_0 e^{-[(N\sigma t)_{H_2O}+(N\sigma t)_{Al}+(N\sigma t)_C+(N\sigma t)_{Cu}+\cdots]}}{I_0 e^{-[(N\sigma t)_{Al}+(N\sigma t)_C+(N\sigma t)_{Cu}+\cdots]}} = e^{-(N\sigma t)_{H_2O}}$$

From their ratio, the thickness or accumulation of the water can then be evaluated at each pixel.

$$t_{H_2O} = \frac{-\ln\left(\frac{I_{wet}}{I_{dry}}\right)}{N\sigma} = \frac{-\ln\left(\frac{I_{wet}}{I_{dry}}\right)}{2.96}$$

Here, the value of 2.96 for the product of $N\sigma$ was obtained via calibration, by measuring neutron beam attenuation for known water thicknesses.

Figure 6:
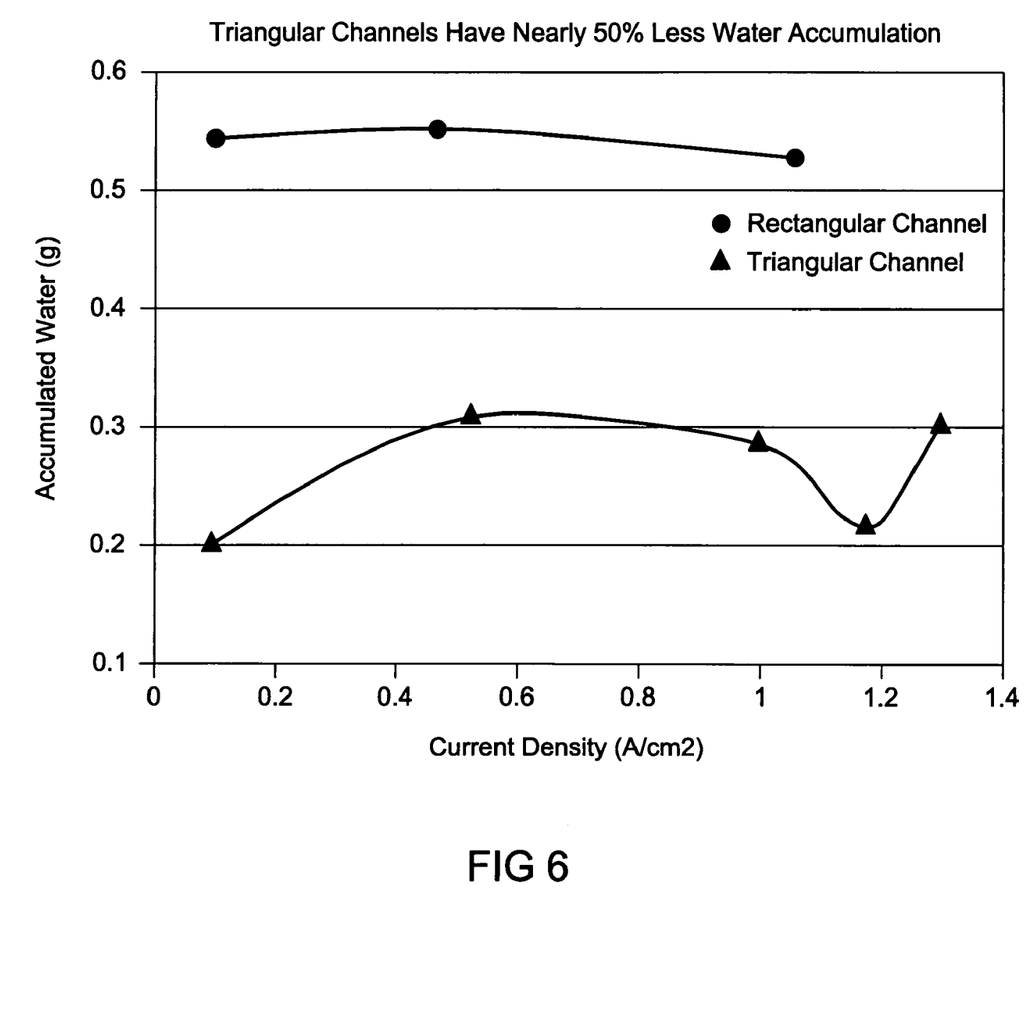
FIG. 6 is a graph depicting a comparison of the water accumulated in both channels according to the present invention and the prior art.

In this manner, the amount of water that accumulates in the channels having the perpendicular sidewalls found in a conventional cell can be compared with the amount of water that accumulates in the channels 74 of the present invention with a ramped sidewall geometry. Referring to FIG. 6, a graph is depicted that exhibits a comparison of water accumulation in a conventional, rectangular channel with the water accumulation in a channel 74 with a modified geometry. In this example, the channel 74 includes a triangular cross-section. The accumulation of water is measured at varying current densities. As shown in FIG. 6, it can be seen that the rectangular cross-section with perpendicular sidewalls sidewalls accumulates a much greater amount of water than the triangular cross-section with ramped sidewalls.

It should be noted that reducing the water accumulation in the channels 74 is beneficial to the overall performance of the cell. More particularly, a lower water accumulation improves performance at low load levels because a greater amount of the gaseous reactants can be in contact with the electrochemically active material of the anode and cathode electrodes 60 and 62. Further, when too much water is present in the channels 74, the fuel cell can flood, which reduces the current density produced by the electrochemical reaction of the fuel cell. Still further, a lower water accumulation is beneficial in that it lowers the chance that the water will freeze in the fuel cell during cold weather which can damage the sensitive components of the fuel cell and inhibit start-up.

It should also be understood that when using a ramped sidewall geometry for the channels 74, the water will be drawn into the sharpest corner 80 of the channel 74. For example, in the triangular channel 74 shown in FIG. 4, the size of each angle dictates where the water will be accumulated. As such, it should further be understood that the location of the accumulated water can be dictated by any design contemplated. Moreover, in utilizing this aspect of the present invention, liquid water may be forced away from the diffusion medium 64 which will further improve fuel cell performance by reducing the resistance to flow of the reactant gases. That is, as stated above, a greater amount of the gaseous reactants will be in contact with the electrochemically active material of the anode 60 and cathode 62 electrodes, which will increase the electrochemical activity of the fuel cell.

Figure 4:
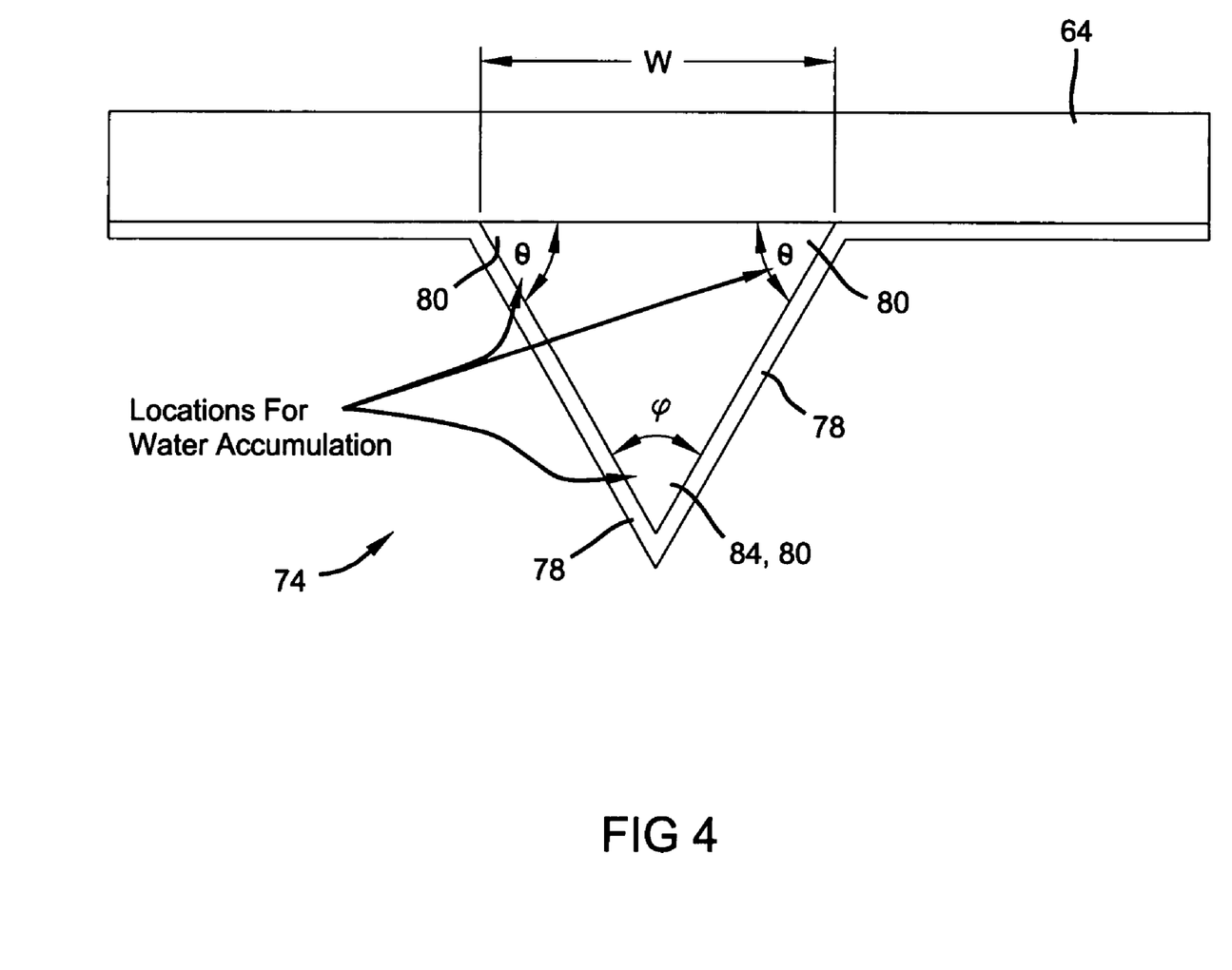
FIG. 4 is a cross-sectional view of a channel according to a first embodiment of the present invention.

Still referring to FIG. 4, a first embodiment invention will now be described in more detail. In FIG. 4, the cross-section of the channel 74 is an equilateral triangle. That is, each of the interface angles θ that are located at the diffusion medium/gas channel interface are 60°, and the apex angle φ at the apex 84 of the triangular cross-section is also 60°. The water, therefore, will tend to accumulate in all three corners 80 of the channel 74 generally simultaneously.

Moreover, it should be understood that a when using an equilateral triangle as a template for the ramped sidewalls of the channel 74, a geometric relationship between the width and depth of the channel 74 emerges. More specifically, recognizing that tan(60°)=2D/W, where D and W represent the depth and width of the channel 74, respectively, an aspect ratio of the depth and width of the channel 74 can be established as follows:

Tan(60°)=2D/W 1.73=2D/W

D/W=0.87

Figure 7:
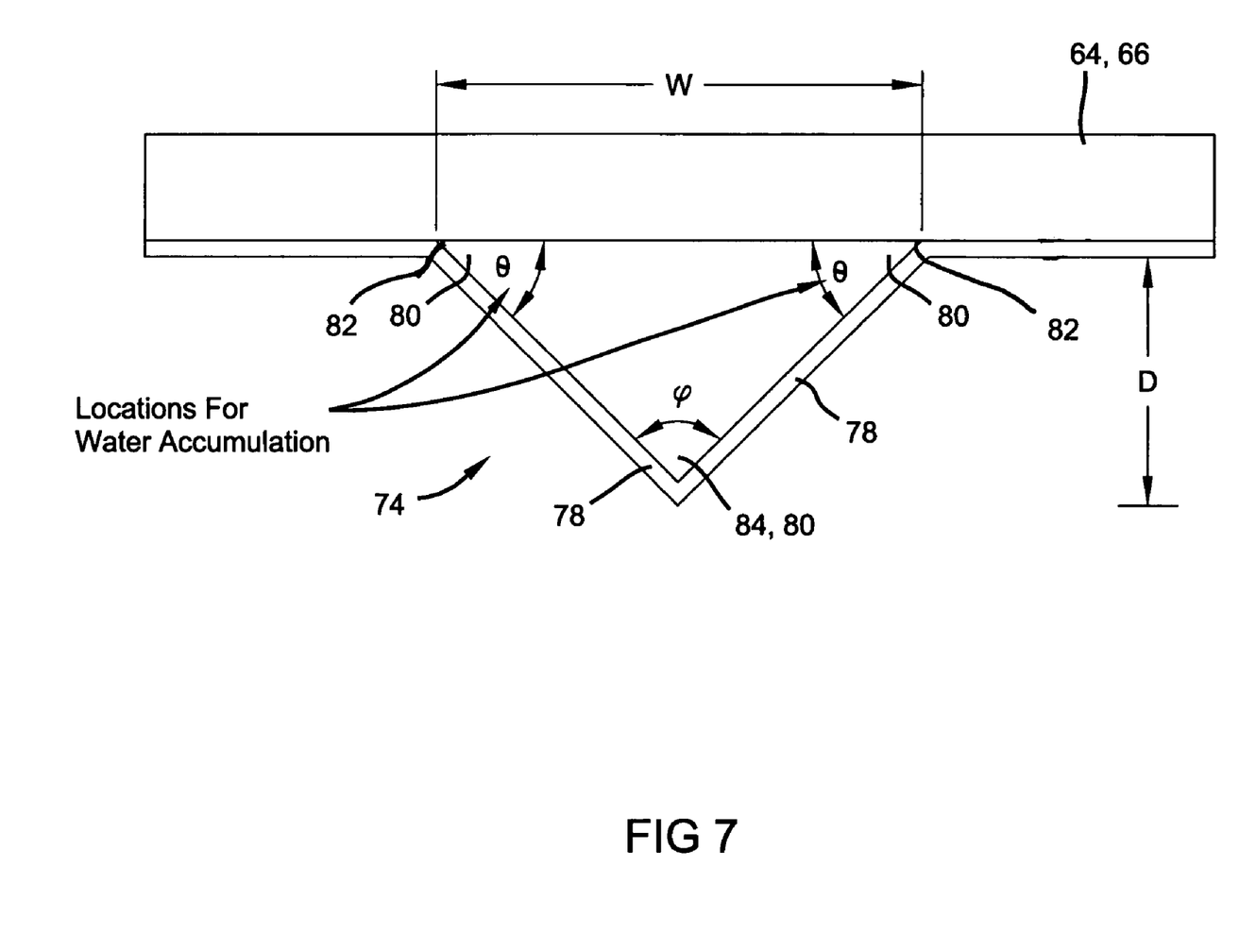
FIG. 7 is a cross-sectional view of channel according to a variation of the first embodiment of the present invention.

In utilizing this aspect ratio, it can be determined with certainty where the water will accumulate. As such, cross-sectional geometries can be designed with designated localized water collection regions. For example, referring to new FIG. 7, a variation of the first embodiment wherein the ratio of D/W has been made less than 0.866 is shown. In order to decrease the ratio below 0.866, the width of the channel 74 is increased such that the cross-section of the channel 74 becomes an isosceles triangle for the channel illustrated in FIG. 7, the interface angle is 45° and the apex angle is 90°. Thus, the aspect ratio is 0.5. By increasing the width of the channel 74, the two angles θ adjacent to the diffusion media 64 each have an angle less than the angle φ of the apex 84 of the triangle cross-section. Since these angles θ are less than the angle φ at the apex 84 of the triangular cross-section, water will tend to accumulate in these portions. This is because, as stated above, the water will tend to collect in the sharpest corners 80 of the cross-sectional geometry. As such, you can control that the water will tend to collect at the interface 82 of the diffusion media 64 and channel 74.

Figure 8:
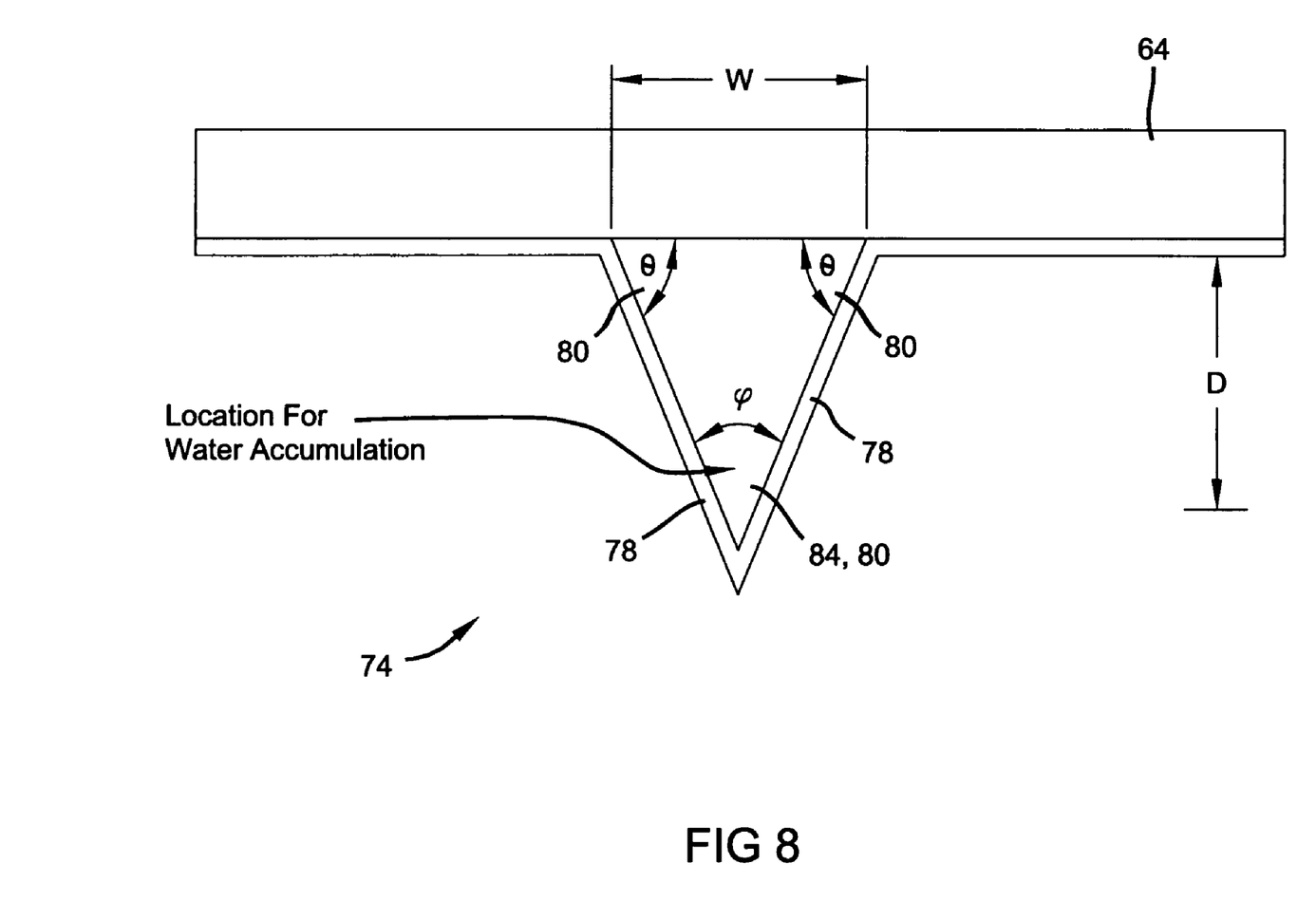
FIG. 8 is a cross-sectional view of a channel according to another variation of the first embodiment of the present invention.

Now referring to FIG. 8, the apex angle φ of the cross-sectional geometry has a lower angle than the angles θ adjacent the diffusion medium 64. This is accomplished by increasing the depth of the channel 74 and/or narrowing the width of the channel 74 such that the aspect ratio is greater than 0.866. For the channel illustrated in FIG. 8, the interface angle is about 67° and the apex angle is about 45°. Thus, the aspect ratio is 1.2. Such a configuration causes the water to accumulate in the apex portion 84 of the triangular cross-section. This will, in turn, allow more of the gaseous reactants to contact the anode 60 or the cathode electrodes 62 which will increase the electrochemical reaction of the fuel cell.

Figure 9:
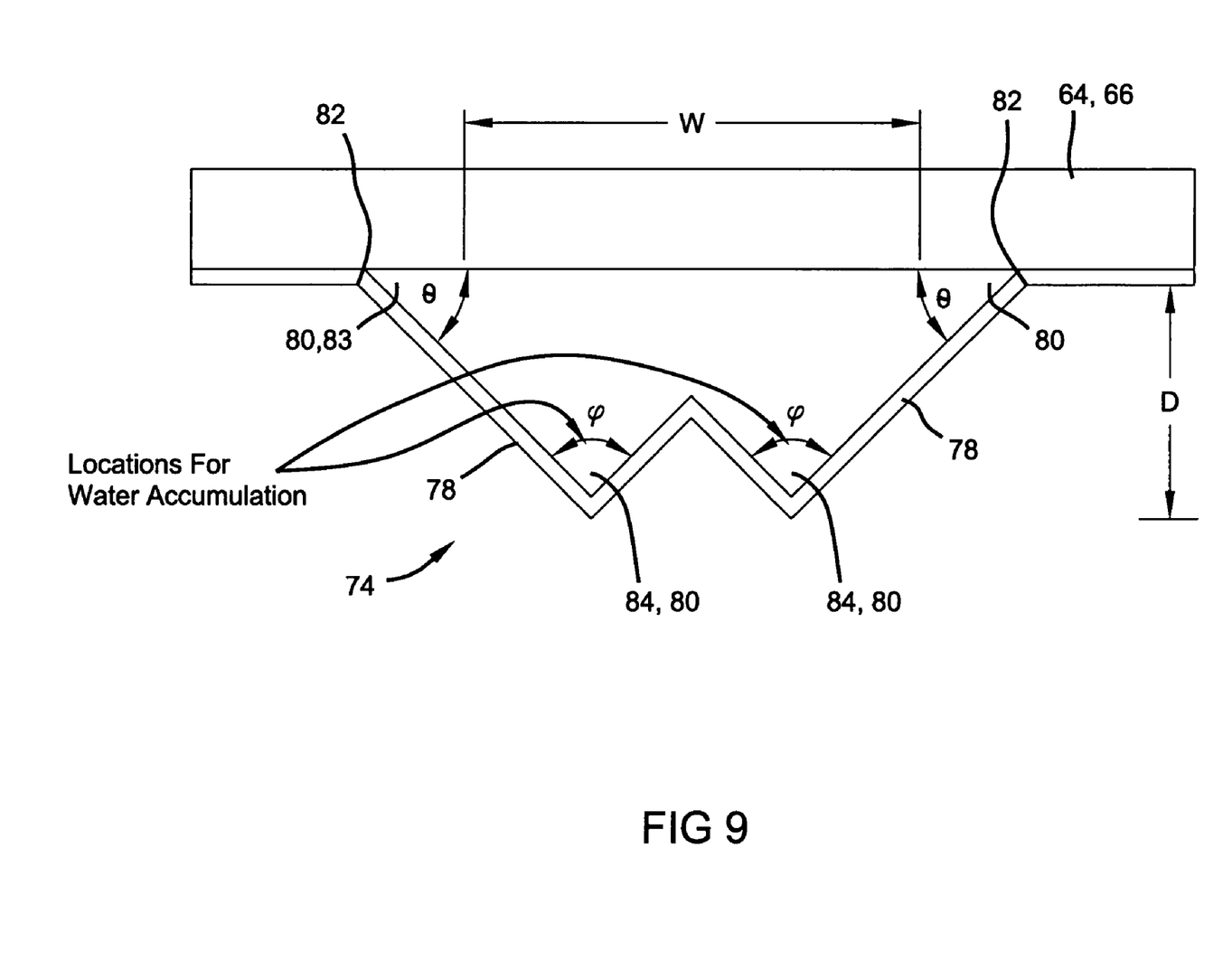
FIG. 9 is a cross-sectional view of a channel according to a second embodiment of the present invention.

Now referring to FIG. 9, a double-triangular channel 74 or a "W" shaped channel 74 will be described. In this embodiment, there are two corners 80 that are adjacent to the diffusion medium 64 with an interface angle θ and there are two apexes 84 of the cross-section with an apex angle φ. By making each of the four angles (θ and φ) equal to 60°, water will tend to accumulate in each of the corners 80 and the apexes 84 of the cross-sectional geometry. Alternately, the apex angles φ can be made less than the interface angles θ at the diffusion medium/gas channel interface. Again, this is accomplished by narrowing the width or increasing the depth of the channel 74. As such, water will tend to accumulate at the bottom of the channel 74 in the apexes 84 of the "W" shaped cross-section. As stated above, this is beneficial in that the water will tend to accumulate away from the gas diffusion media 64 which will allow more gaseous reactants to approach the anode 60 and cathode 62 surfaces of the electrodes which, in turn, increases the electrochemical activity of the fuel cell.

Figure 10:
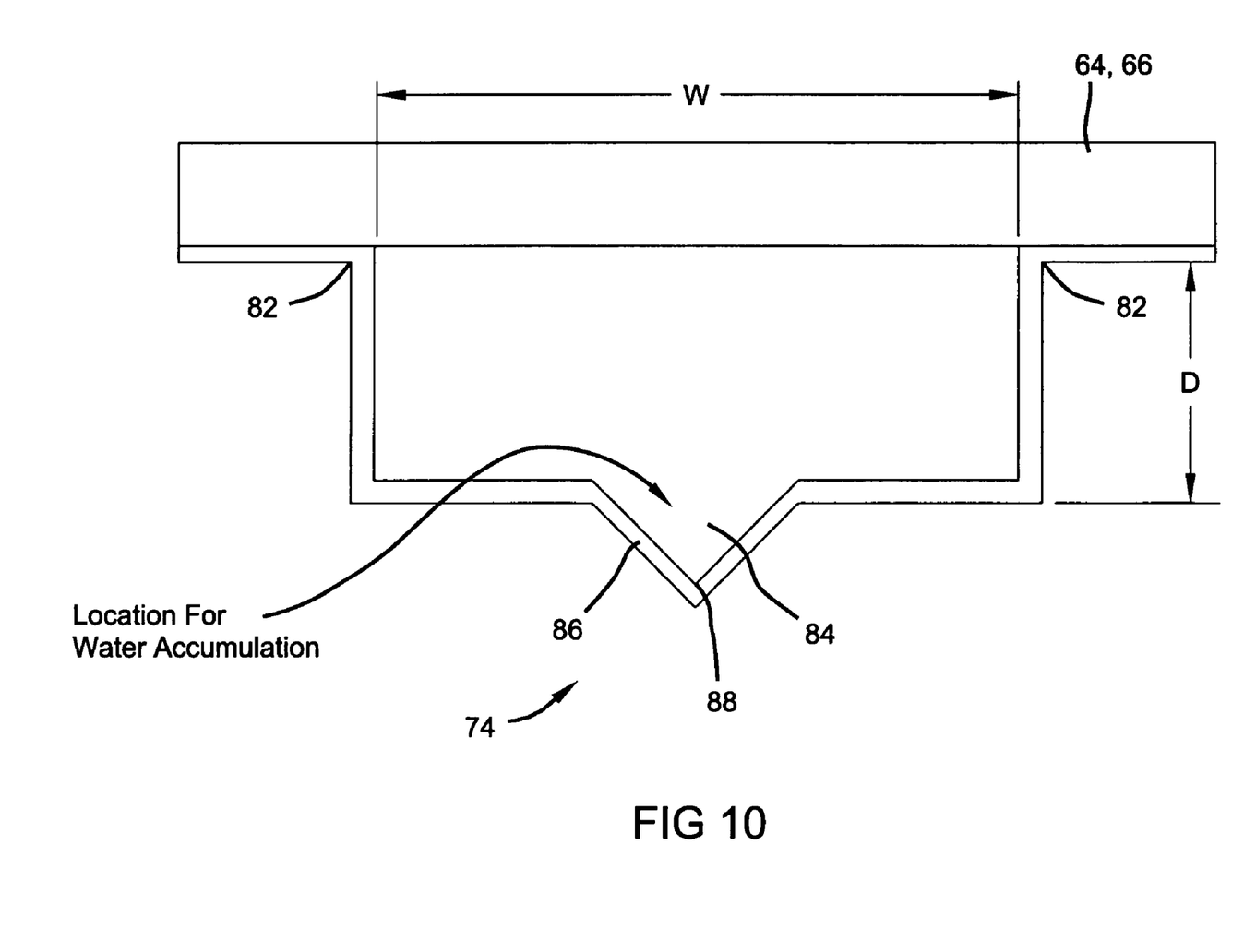
FIG. 10 is a cross-sectional view of a channel according to a third embodiment of the present invention.

Now referring to FIG. 10, yet another cross-sectional geometry will be described. In FIG. 10, it can be seen that the cross-sectional shape of the channel 74 is rectangular in cross-section with a recessed portion 88 at the bottom of the rectangular cross-section. In this instance, the recessed portion 88 is triangular. Since the apex 84 of this triangular portion has an angle less than the right angles of the rectangular portion of the cross-section, water will tend to accumulate in this triangular portion. Again, this configuration provides a localized water accumulated region which allows water to collect at the bottom of the channel 74, away from the active area of the electrodes 60 and 62.

Figure 11:
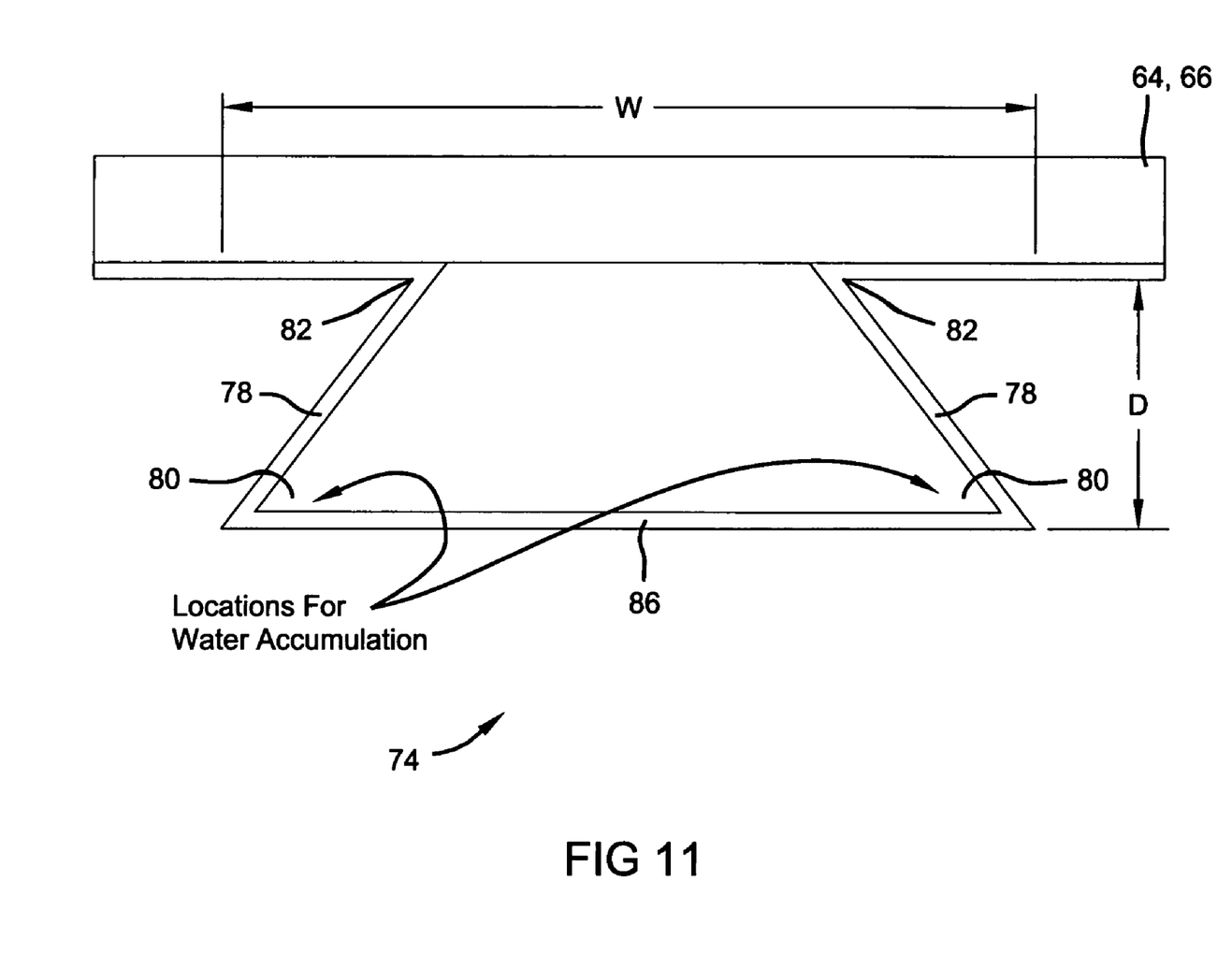
FIG. 11 is a cross-sectional view of a channel according to a fourth embodiment of the present invention.

Now referring to FIG. 11, still another cross-sectional geometry will be described. In FIG. 11, the cross-sectional geometry of the channel 74 is trapezoidal in shape. The trapezoidal shape includes the sharpest corners 80 or angles at the bottom of the channel 74. As such, the locations for water accumulation will be at the bottom of the channel 74 where the sharpest angles of the trapezoidal cross-section are located. The trapezoidal-shaped cross-section can also include the recessed portion 88 at the bottom of the channel 74 described above and depicted in FIG. 10.

In each of the above embodiments, it should be understood that water will be drawn to the sharpest corner 80 or angle of the cross-sectional geometry. In this regard, the angles or corners 80 of the cross-sectional geometries for water accumulation are preferably acute angles less than 90°, more preferably acute angles in the range of 10–70°, and most preferably acute angles in the range of 45–60°. With respect to varying the angles of the cross-section by adjusting the width and depth of the channel 74, it is preferable that the width be in the range of 0.5–3 mm, and most preferably in the range of 0.5–2 mm. The depth is preferably in the range of 0.3–2 mm, and most preferably in the range of 0.3–1 mm.

Furthermore, although it is especially preferable that a bipolar plate 70 with a cathode flow field include channels 74 with a ramped sidewall geometry, the present invention has similar benefits when used for the anode flow field, as well. This is because although water is more prevalently produced as a by-product of the fuel cell on the cathode side 62 of the MEA 58, the overall environment of a fuel cell is humid. As such, water management is a concern on the anode side 60 of the MEA 58 as well.

With respect to a material used to form the electrically conductive fluid distribution elements 68 and 70, or bipolar plates 68 and 70, any type of material may be used and is contemplated. Preferable materials for use as the bipolar plates 68 and 70 include stainless steel, aluminum, titanium, a composite material, or a polymeric material. The composite material may further include carbon fibers, graphite fibers, steel fibers, or any other electrically conductive material which facilitates electrical conductivity. Furthermore, it is not out of the scope of the present invention to coat the bipolar plates 68 and 70 with a coating such as a noble metal, titanium, aluminum, metal oxides, or other known surface coating which enhance electrical conductivity and may further assist in corrosion resistance.

When the bipolar plates 68 and 70 are formed from a metal such as steel, aluminum, or titanium, it is preferable that a stamping method be used to form the channels 74 including the modified geometry. In this respect, it is only preferable to use a stamping method when the channel geometry is relatively simple in nature. That is, when the geometry is triangular-shaped, "W"-shaped, or rectangular-shaped with a triangular apex 84. In the event that the channel geometry is relatively complex in nature, it is preferable to use a composite or polymeric plate. For example, if the modified geometry to be utilized is the trapezoidal-shaped geometry shown in FIG. 11, it is preferable to use a composite or polymeric plate formed by compression, injection molding, or the like.

With respect to the flow field including the gas channels 74 with a ramped sidewall geometry, it should be understood that the flow field may be disposed on the element in any pattern desired. For example, the flow field may be disposed on the element 68 and 70 in a serpentine pattern, where the channels 74 meander back and forth across the surface of the element 68 and 70; in a straight pattern, where the channels 74 simply traverse the surface of the element 68 and 70 and do not make any turns; or in a complex pattern, where the channels 74 are disposed in a variety of directions in order to increase/decrease the electrochemical activity of the electrodes 60 and 62 in areas that are a greater/closer distance away from the inlets that provide the gaseous reactants. Likewise, the flow field may be continuous or interdigital from the inlet region to the exhaust region.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A fluid distribution assembly for use in a fuel cell comprising:
   a separator plate having a major face;
   a boundary element disposed over said major face; and
   a flow field having a channel formed in said separator plate at said major face, said channel and said boundary element defining a cross-sectional configuration which provides a water accumulation region along a length of said channel, said channel having sidewalls defining a width and a depth, an acute angle defined at an interface between said sidewalls and said boundary element, said width continuously decreasing along said depth of said channel in a direction generally away from said boundary element.

2. The fluid distribution assembly of claim 1 wherein said water accumulation region is provided at an acute angle of said cross-sectional configuration.

3. The fluid distribution assembly of claim 1 wherein said cross-sectional configuration of said channel is v-shaped.

4. The fluid distribution assembly of claim 3 wherein said cross-sectional configuration comprises an equilateral triangular cross-section.

5. The fluid distribution assembly of claim 3 wherein said triangular cross-sectional configuration comprises an isosceles triangular cross-section.

6. The fluid distribution assembly of claim 1 wherein said cross-sectional configuration of said channel is w-shaped.

7. The fluid distribution assembly of claim 1 wherein said cross-sectional configuration of said channel is trapezoidal.

8. The fluid distribution assembly of claim 1 wherein said cross-sectional configuration of said channel includes a recessed portion.

9. The fluid distribution assembly of claim 1 wherein said recessed portion of said cross-sectional configuration is v-shaped.

10. A fuel cell comprising:
    a separator plate including a flow field formed in a major face thereof, said flow field including a channel having a pair of sidewalls; and
    a membrane electrode assembly disposed at said major face over said flow field;
    wherein said pair of sidewalls intersect said membrane electrode assembly to form a cross-sectional geometry having a water accumulation region, said cross-sectional geometry having a width and a depth defined by said sidewalls, an acute angle defined at an interface between said sidewalls and said boundary element, said width continuously decreasing along said depth of said channel in a direction generally away from said boundary element.

11. The assembly of claim 10 wherein said acute angle is defined as a function of an aspect ratio of a channel width and a channel depth.

12. The assembly of claim 11 wherein said aspect ratio of said channel is in the range of about 0.25–10.

13. The assembly of claim 10 wherein said water accumulation region is defined in at least one corner of said cross-sectional geometry, said at least one corner having an angle not greater than about 75 degrees.

14. The assembly of claim 13 wherein said at least one corner having an angle in the range of 10–60 degrees.

15. The assembly of claim 10 wherein said cross-sectional geometry of said channel comprises at least one water accumulation region at a bottom portion of the channel.

16. The assembly of claim 14, wherein said water accumulation region comprises a v-shaped recess formed in said bottom portion of said channel.

* * * * *